(12) United States Patent
Kwok et al.

(10) Patent No.: US 6,683,873 B1
(45) Date of Patent: Jan. 27, 2004

(54) METHODS AND APPARATUS FOR REDIRECTING NETWORK TRAFFIC

(75) Inventors: Danny Kwok, Los Altos, CA (US); Gurumukh S. Tiwana, Cupertino, CA (US); James A. Aviani, Jr., Santa Barbara, CA (US); Martin Cieslak, Fremont, CA (US); Martin A. Kagan, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/476,188

(22) Filed: Jan. 3, 2000

Related U.S. Application Data (63) Continuation-in-part of application No. 09/472,758, filed on Dec. 27, 1999, now abandoned.

(51) Int. Cl.[7] .............................................. H04L 12/28
(52) U.S. Cl. ........................ 370/389; 370/401; 709/217; 709/238; 711/118
(58) Field of Search ................................ 370/389, 351, 370/400, 401, 422, 428, 902, 911; 709/229, 238, 245, 217, 230, 223, 216, 218; 711/141, 118

(56) References Cited

U.S. PATENT DOCUMENTS

| | | | | |
|---|---|---|---|---|
| 5,852,717 A | * | 12/1998 | Bhide et al. | 709/203 |
| 6,073,168 A | * | 6/2000 | Mighdoll et al. | 709/217 |
| 6,088,721 A | * | 7/2000 | Lin et al. | 709/214 |
| 6,205,481 B1 | * | 3/2001 | Heddaya et al. | 709/226 |
| 6,253,234 B1 | * | 6/2001 | Hunt et al. | 709/213 |
| 6,389,462 B1 | * | 5/2002 | Cohen et al. | 709/218 |
| 6,434,608 B1 | * | 8/2002 | Desai | 709/217 |
| 6,510,469 B1 | * | 1/2003 | Starnes et al. | 709/247 |
| 6,519,646 B1 | * | 2/2003 | Gupta et al. | 709/229 |

* cited by examiner

*Primary Examiner*—Dang Ton
*Assistant Examiner*—Tri H. Phan
(74) *Attorney, Agent, or Firm*—Beyer Weaver & Thomas, LLP.

(57) ABSTRACT

Methods and apparatus are described for controlling packet flow to a cache system is disclosed. A packet flow intended for a first destination is received into the cache system. When the packet flow indicates the start of the packet flow or when the packet flow is identified as being owned by the cache system, the packet flow is processed within the cache system. When the packet flow does not indicate the start of the packet flow and the packet flow is not identified as being owned by the cache system, the packet flow is directed back to the first destination.

30 Claims, 6 Drawing Sheets

METHODS AND APPARATUS FOR REDIRECTING NETWORK TRAFFIC

CROSS REFERENCE TO RELATED APPLICATIONS

This application is a continuation-in-part of and claims priority of U.S. Patent Application, having application Ser. No. 09/472,758 filed Dec. 27, 1999 ABANDONED entitled, "METHODS AND APPARATUS FOR REDIRECTING NETWORK TRAFFIC" by Kwok et al, which application is incorporated herein by reference in its entirety for all purposes.

BACKGROUND OF THE INVENTION

The present invention relates to transmission of data in a network environment. More specifically, the present invention relates to methods and apparatus redirecting network traffic. Still more specifically, techniques are described herein for redirecting packet flows from a device that does not own the flows.

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy".

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

Network caching represents an improvement over the proxy server model which is transparent to end users, high performance, and fault tolerant. By altering the operating system code of an existing router, the router is enabled to recognize and redirect data traffic having particular characteristics such as, for example, a particular protocol intended for a specified port (e.g., TCP with port 80), to one or more network caches connected to the router via an interface having sufficient bandwidth. If there are multiple caches connected to the cache-enabled router, the router selects from among the available caches for a particular request based on a load balancing mechanism.

The network cache to which the request is re-routed "spoofs" the requested destination platform and accepts the request on its behalf via a standard TCP connection established by the cache-enabled router. If the requested information is already stored in the cache it is transmitted to the requesting platform with a header indicating its source as the destination platform. If the requested information is not in the cache, the cache opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. An example of such a network caching technique is embodied in the Web Content Caching Protocol (WCCP) provided by Cisco Systems, Inc., a specific embodiment of which is described in copending, commonly assigned, U.S. patent application Ser. No. 08/946,867 for METHOD AND APPARATUS FOR FACILITATING NETWORK DATA TRANSMISSIONS filed Oct. 8, 1997, the entirety of which is incorporated herein by reference for all purposes.

As a cache system starts up, traffic that is redirected to the cache system may become disrupted under certain conditions. For example, if a new flow is established while the cache system is shut down, this new flow will not be recognized by the cache system when it reconnects or starts up. (A flow is generally defined as a stream of packets or traffic that originates from a same source and is directed to a same destination.) In other words, the cache system receives the packets in mid-flow after the flow has been established with some other destination. Since the flow has not been established with the cache system, it is not recognized as belonging to the cache system. This unrecognized flow will be reset by the cache system under current TCP procedures. Thus, any flows that are established outside of the cache system, i.e. with the intended destination, will be automatically reset when the cache system starts up and such flows are redirected to the cache system. Of course, any flow disconnects are undesirable. As the number of clients that access a given cache system at one time increase, the incidence of traffic disruptions caused by a cache system starting up during mid-flow also increase. Thus, the cache system may affect a significantly large amount of traffic during start up. Therefore, there is a need for improving a cache system's start up procedures such that traffic is not disrupted by the cache system.

SUMMARY OF THE INVENTION

Accordingly, the present invention provides an apparatus and method for intelligently determining whether a cache system is going to process an incoming packet flow or redirect it to its original intended destination. The originally intended destination is the destination that is "spoofed" by the cache system if it decides to process a flow. If a cache system is shut down and then restarted, a client may have established a flow with another destination (i.e., the original intended destination). Thus, a flow may be received into the cache system during mid-flow. Rather than accept such a non-established packet flow, the cache system determines that it does not own the packet flow and redirects it to the original intended destination. In one embodiment, the cache system simply checks whether the packet flow is listed within a monitor flow table. If the packet flow was initially established with the cache system, the flow will be identified within the monitor flow table. In one embodiment, a new packet flow is identified within the table when the new packet flow is established at the cache system. Similarly, the cache system may check the monitor flow table prior to shutting down. Prior to shutting down, the cache system may respond to flow completion requests from flows that are owned by the cache system. Otherwise, flow completion requests from a flow that is not owned by the cache system are redirected to the flow's original intended destination.

In one embodiment, a method for controlling packet flow to a cache system is disclosed. A packet flow intended for a first destination is received into the cache system. When the packet flow indicates the start of the packet flow or when the packet flow is identified as being owned by the cache system, the packet flow is processed within the cache system. When the packet flow does not indicate the start of the packet flow and the packet flow is not identified as being owned by the cache system, the packet flow is directed back to the first destination.

In another aspect, the invention pertains to a computer system operable to control a packet how directed to the computer system. The computer system includes a memory and a processor coupled to the memory. The memory and the processor are adapted to provide the above described methods. In another embodiment, the invention pertains to a computer program product for controlling packet flow to a cache system. The computer program product includes at least one computer readable medium and computer program instructions stored within the computer readable product configured to cause a processing device to perform the above described methods.

In another embodiment, flows are redirected for cache nodes that are being assigned new or different buckets. Bucket assignments generally indicate which flows go to which cache node of a particular cache cluster. For example, when a new cache node joins a particular cache cluster, buckets may be reassigned to accommodate such new node. Flows that are assigned to these candidates for displacement are redirected to their original intended destination. Thus, the number of flows to a candidate node eventually falls to zero, whereby the buckets may then be moved or reassigned.

The present invention provides a number of advantages. For example, since a cache system is configured to only process packet flows that are owned by the cache system, flow disruption may be significantly decreased during startup of the cache system. The cache system doesn't process flows that it doesn't own. Thus, it is unlikely that the flows processed by the cache system will be unrecognized by the cache system and subsequently terminated. Thus, after startup, the cache system intercepts traffic slowly.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
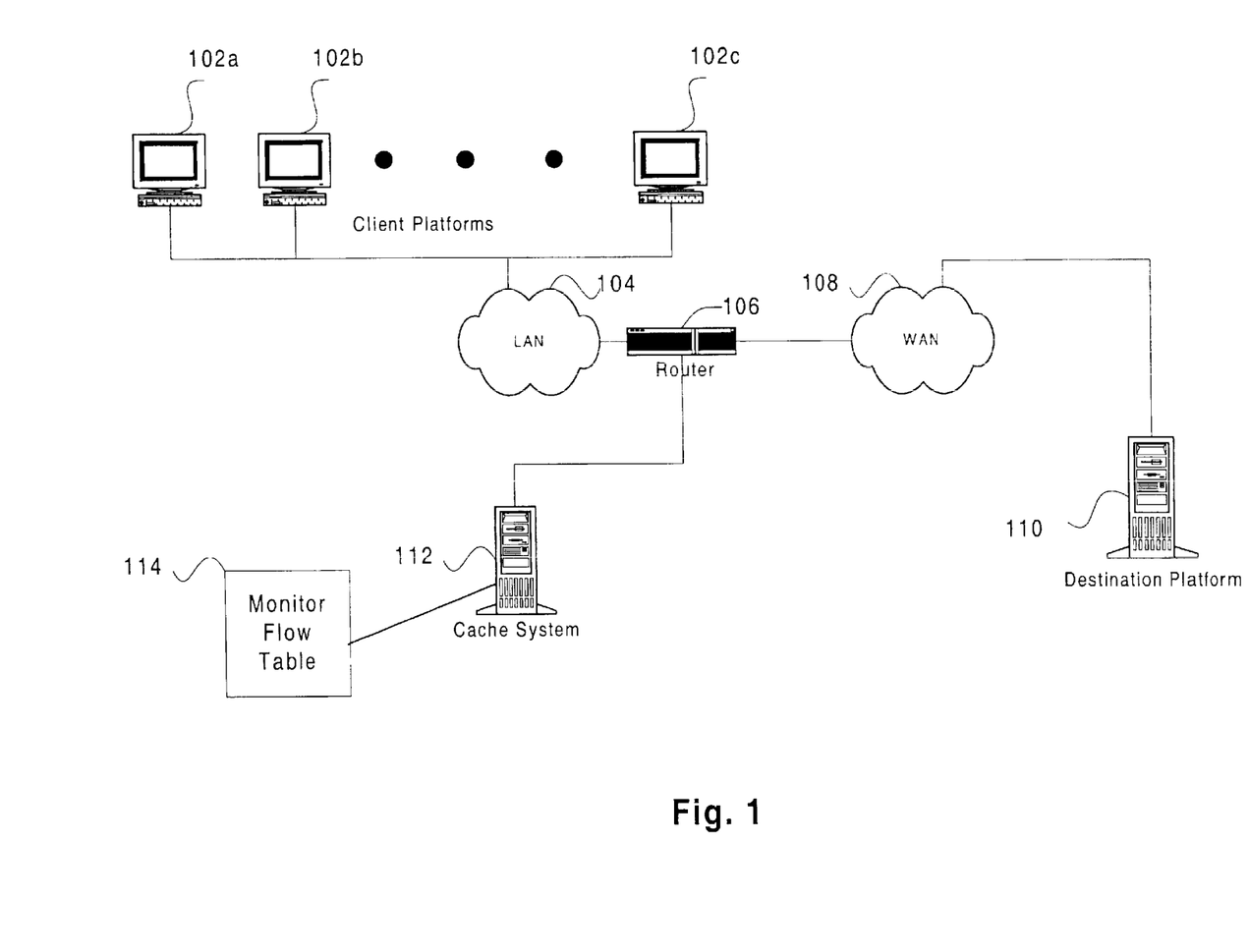
FIG. 1 is a network diagram illustrating a cache system disconnect and startup technique according to a specific embodiment of the present invention.
Figure 2:
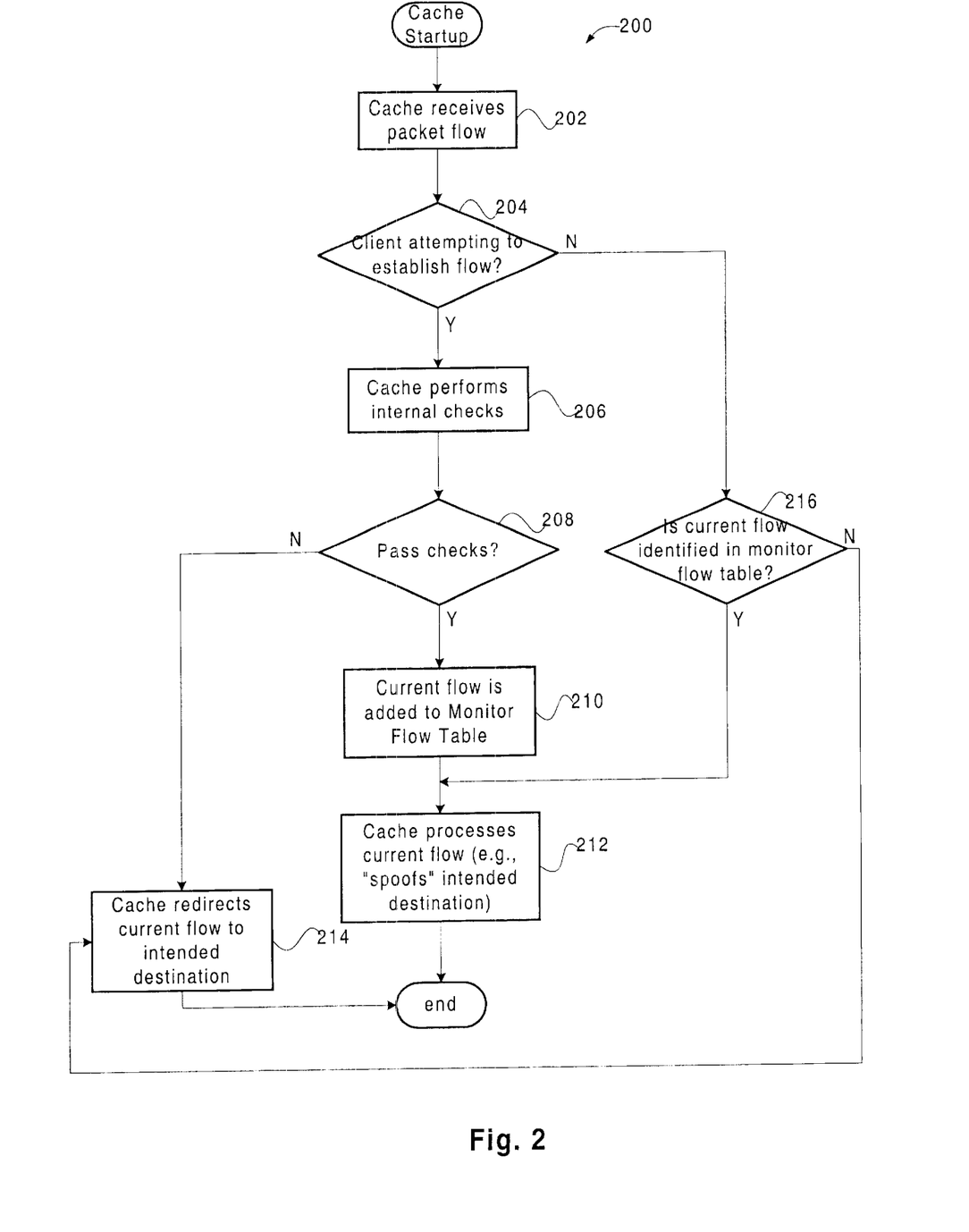
FIG. 2 is a flowchart illustrating a cache system startup technique according to a specific embodiment of the present invention.
Figure 3:
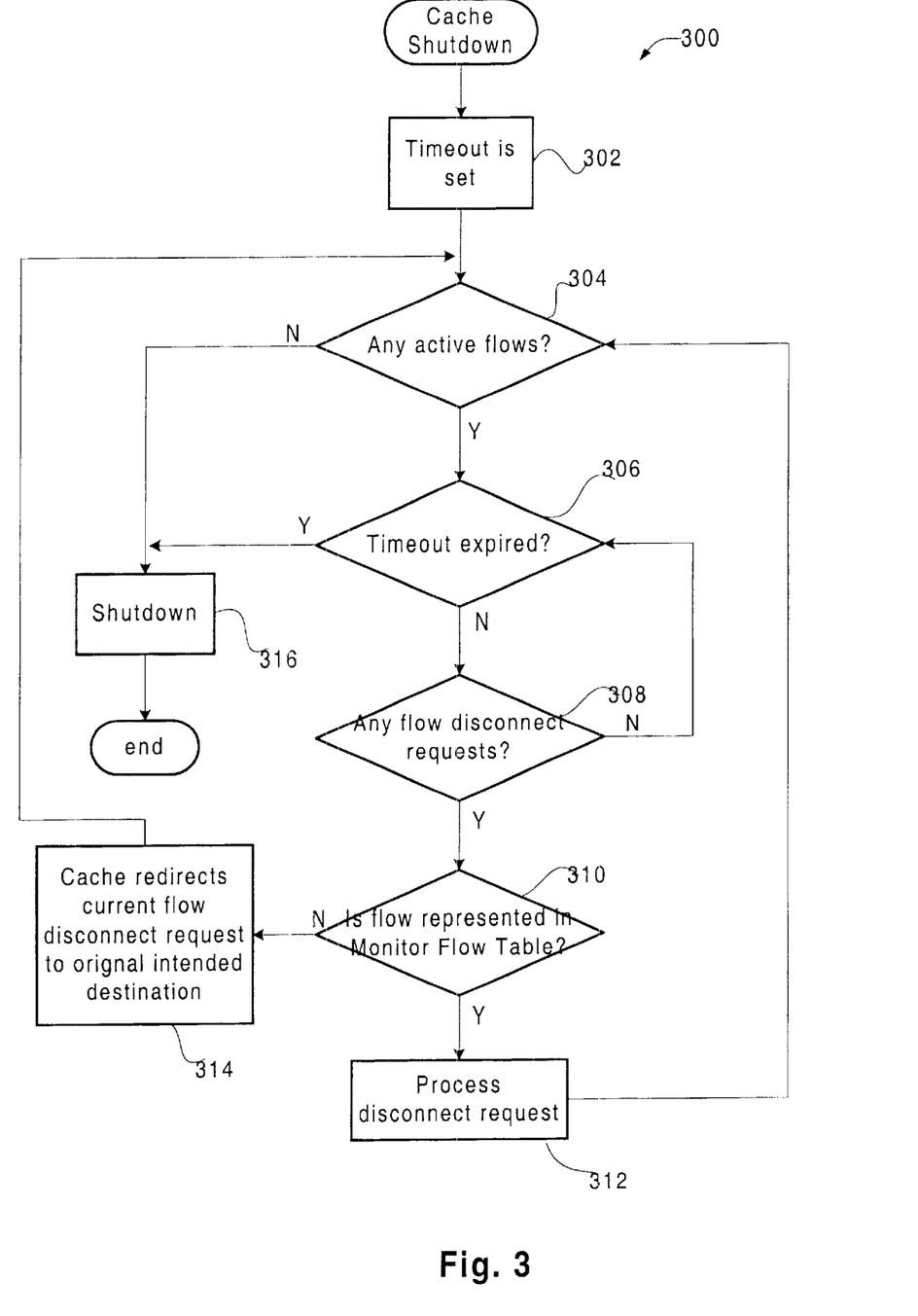
FIG. 3 is a flowchart illustrating a cache system shutdown technique according to a specific embodiment of the present invention.

FIG. 1 is a simplified network diagram which will be used in conjunction with the flowcharts of FIGS. 2 and 3 to describe a specific embodiment of the present invention. According to this embodiment, a plurality of client machines 102 which are resident on a local area network (LAN) 104 communicate via router 106 and wide area network (WAN)

108, e.g., the internet, with server 110. Of course, some or all of the clients 102 may communicate with the router 106 through various other configurations, rather than through a LAN. For example, a client may be coupled directly to the router 106 or there may be one or more intermediate routers between a client 102 and the router 106. As discussed above, the router 106 may direct certain traffic, e.g., destined for port 80, to a cache system 112 which is configured to "spoof" server 110. Cache system 112 responds to a request from a client 102 to obtain objects from destination platform 110. The cache system 112 either retrieves objects from destination platform 110 to then present to one of the clients or retrieves objects from its own cache (which objects were previously retrieved from the destination platform 110).

FIG. 2 is a flowchart representing a start up routine 200 for cache system 112 in accordance with one embodiment of the present invention. Initially, cache system 112 receives a packet flow (202) from any one of clients, such as client 102a. The cache system 112 then determines whether the sending client 102a is attempting to establish a new flow (204). The cache system 112 then may determine whether a flow is being established in any suitable manner. For example, if the client 102 is sending a "SYN" flag, this indicates that the client is initiating a flow. On the other hand, if the client sends a "FIN", this indicates that the client is attempting to stop a flow. By way of another example, if the client sends an "ACK", it may be determined that the client is merely acknowledging a previous response from the cache system 112 or from the originally intended destination 110.

If the client is attempting to establish a flow, the cache system 112 then performs a number of internal checks (206) prior to processing the flow. It is then determined whether the cache system 112 passes these checks (208) prior to processing the flow. If the internal checks are not passed, the current flow is redirected to the originally intended destination (214) and not processed by the cache system 112. A packet redirection protocol which may be implemented with a network caching technique is described in copending, commonly assigned, U.S. Provisional Patent Application No. 60/168,862 for METHOD AND APPARATUS FOR REDIRECTING NETWORK TRAFFIC filed Dec. 2, 1999, the entirety of which is incorporated herein by reference for all purposes. According to a specific embodiment described in that application, the cache systems have the capability of determining that particular redirected packets should be transmitted back to the redirecting router and reinserted into the original traffic flow. This may be done in a manner transparent to the source or destination of the packets. In one aspect, the present invention provides mechanisms for redirecting flow so as to minimize flow disruptions, such as when a cache system has failed its internal checks.

Any suitable number and type of internal checks may be performed to determine whether the cache system 112 is going to process the current flow. For example, the cache system 112 may determine whether it is in shut down mode or overloaded. If the cache system 112 is in shut down mode, the cache system 112 should not process any new flows since the cache system 112 is about to be shut down and some flows may be disrupted by the shutdown. If the cache system 112 is already overloaded, the cache system 112 also should not process any more flows. The cache system 112 may also determine whether the current packet flow is associated with a parameter within a special list. For example, the source or destination of the packet flow may be included within the special list indicating that such source or destination is not to be processed by the cache system. In other words, it may be desirable to tag certain flows to be left alone and not processed by the cache system. For example, a flow may be tagged when the flow needs to first be authenticated by the destination platform. In the illustrated embodiment, flows from client 102a may be tagged as not being processed by cache system 112, while flows from client 102b are not tagged and may be processed by cache system 112.

If all the checks pass, the current flow is then added to the monitor flow table 114 (210). The monitor flow table 114 generally lists which flows are owned by the cache system 112. In other words, flows that are listed within the monitor flow table 114 are flows that were established with the cache system 112. In contrast, flows that are not listed within the monitor flow table 114 were established with other devices, such as the destination platform 110. Flows may be established outside the cache system for any number of reasons. For example, a flow may be established with the destination platform 110 while the cache system 112 is shut down.

The monitor flow table 114 may include any suitable parameters for identifying a flow that is owned by the cache system. In one embodiment, the monitor flow table 114 includes the flow's tuple, a time indicating when the flow was established, and a state of the current flow. For example, the tuple may include the flow's destination IP address, source IP address, destination port, and source port. The flow's state may indicate that the flow is inactive or active.

After the current flow is added to the monitor flow table (210), the cache system 112 may then process the current flow (212). For example the cache system 112 spoofs the intended destination 110. The cache system start up process 200 then ends. The procedure 200 may also be performed each time a packet flow is received, not only at cache system startup. Thus, the present invention allows clients to establish flows with the original destination platform when the cache system is shut down and to continue such flows even after the cache system restarts.

The monitor flow table provides a mechanism for the cache system to check whether packet flows are owned by the cache system. Thus, if it is determined the client is not attempting to establish a flow in operation 204, the cache system 112 then determines whether the current flow is identified within the monitor flow table 114 (216). If the flow is not identified within the monitor flow table, the cache system 112 assumes that the current packet flow was initiated prior to the cache system starting up. If the flow were to then be processed by the cache system, the cache system 112 would not recognize such a packet flow and thereby terminate such flow. Thus, such non-established flows are not processed by the cache system so as to prevent the cache system from terminating the flow. If the current flow is not identified in the monitor flow table 114, the cache system 112 redirects the flow to its intended destination (214) and the start up procedure ends. In other words, the cache system 112 chooses to leave flows alone that were established while the cache system was shut down or unavailable. In sum, the present invention; allows flows that were established prior to a cache system starting up to continue after the cache system starts up.

Otherwise, if the cache system 112 did not redirect the packet flow to its intended destination and attempted to process such a flow, the cache system would automatically send a reset back to the client to kill the flow (e.g., by implementing TCP). A reset occurs when the tuple of the packet flow is not recognized by the cache system. The tuple of the packet flow generally indicates the identity of the packet flow. For example, the tuple may include a destination IP address, a source IP address, a destination port, and a source port. If the flow had been established with the cache system 112, the flow's tuple would then be recognized by the cache system 112. In other words, once a flow is established with the cache system 112, its tuple is tracked by the cache system 112.

FIG. 3 is a flowchart illustrating a cache system shut down procedure 300 in accordance with one embodiment of the present invention. Initially, a timeout variable is set (302). It is then determined whether there are any active flows (304). If there are no active flows the cache system shuts down (316) and the shut down is complete. If there are active flows present, it is then determined whether the timeout variable has expired (306). For example, a timeout of 5 seconds may be set to allow current flows to end in a reasonable amount of time. If the timeout variable expires, the cache system then shuts down (316). If the timeout variable has not expired, it is then determined whether any flow disconnect requests are present (308). In TCP, for example, a "FIN" may be sent by the client to the cache system. If there are no flow disconnect requests, the timeout variable continues to be checked (306).

If a flow disconnect request occurs, it is then determined whether the flow is represented in the monitor flow table 114 (310). If the flow is not represented within the monitor flow table 110, the cache system redirects the current flow disconnect request to the original intended destination (314). It is then again determined whether there are any active flows (304). If the flow is represented within the monitor flow table 114, the disconnect request is processed by the cache system 112 (312). In TCP, the cache system sends a "FIN/ACK" in response to the client's "FIN." The client then sends an "ACK" in response, and the cache system also responds with an "ACK." The client may then simply cease the flow or send a "RST" to reset the connection.

After a disconnect is processed (312) or after a flow is redirected (314), operations 304 through 314 are repeated until there are no more active flows or the timeout variable has expired. In other words, the active flows are allowed to finish within the time out period. Alternatively, all active flows may be allowed to finish without a timeout period. The cache system then shuts down (316) and the shut down procedure 300 is complete.

Figure 4:
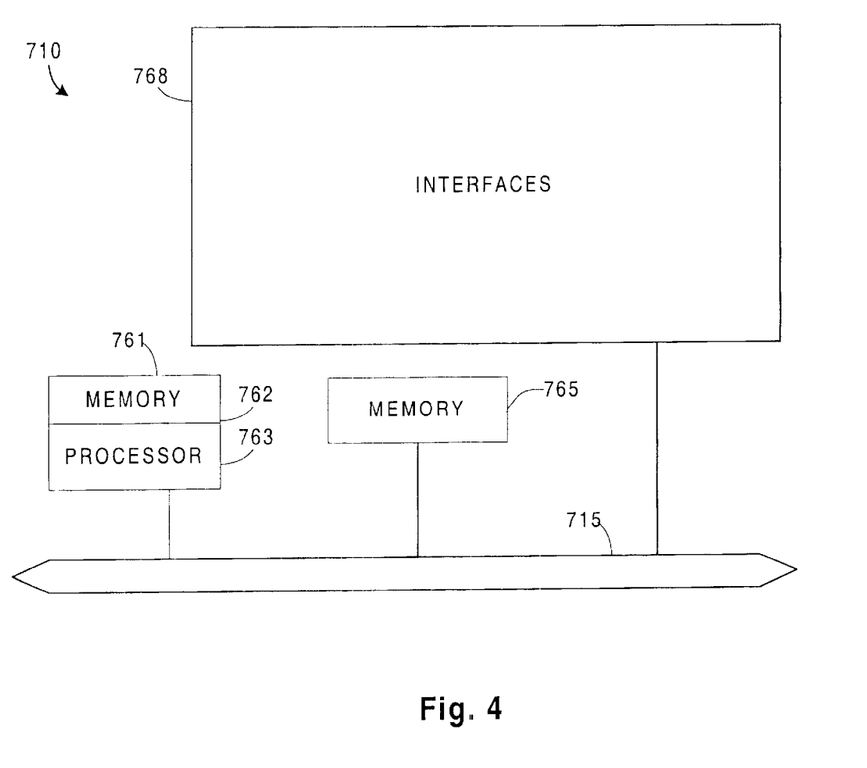
FIGS. 4A and 4B illustrate a computer system suitable for implementing embodiments of the present invention.
Figure 4A:
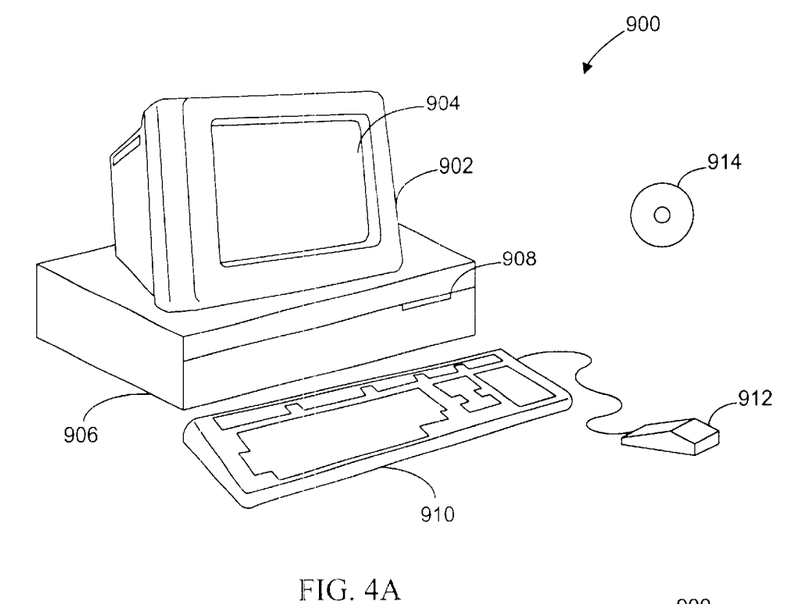
Figure 4B:
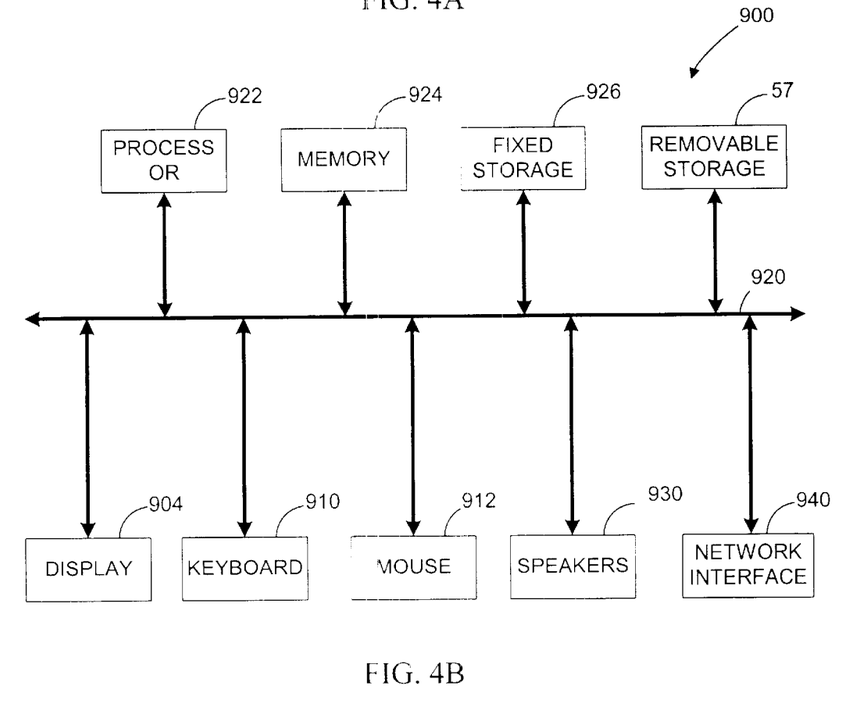

FIGS. 4A and 4B illustrate a cache system 900 (e.g., computer system) suitable for implementing embodiments of the present invention. FIG. 4A shows one possible physical form of the cache system. Of course, the cache system may have many physical forms ranging from an integrated circuit, a printed circuit board and a small hand-held device up to a huge super computer. Cache system 900 includes a monitor 902, a display 904, a housing 906, a disk drive 908, a keyboard 910 and a mouse 912. Disk 914 is a computer-readable medium used to transfer data to and from cache system 900.

FIG. 4B is an example of a block diagram for cache system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

It will be understood that the cache systems described herein may employ any of a variety of existing file systems and remain within the scope of the invention. For example, a Unix general purpose file system or the equivalent may be utilized. A particular embodiment of the invention employs the file system described in commonly assigned, co-pending U.S. patent application Ser. No. 08/937,966 for CACHE MEMORY FILE SYSTEM filed on Sep. 25, 1997, the entire specification of which is incorporated herein by reference for all purposes.

Figure 5:
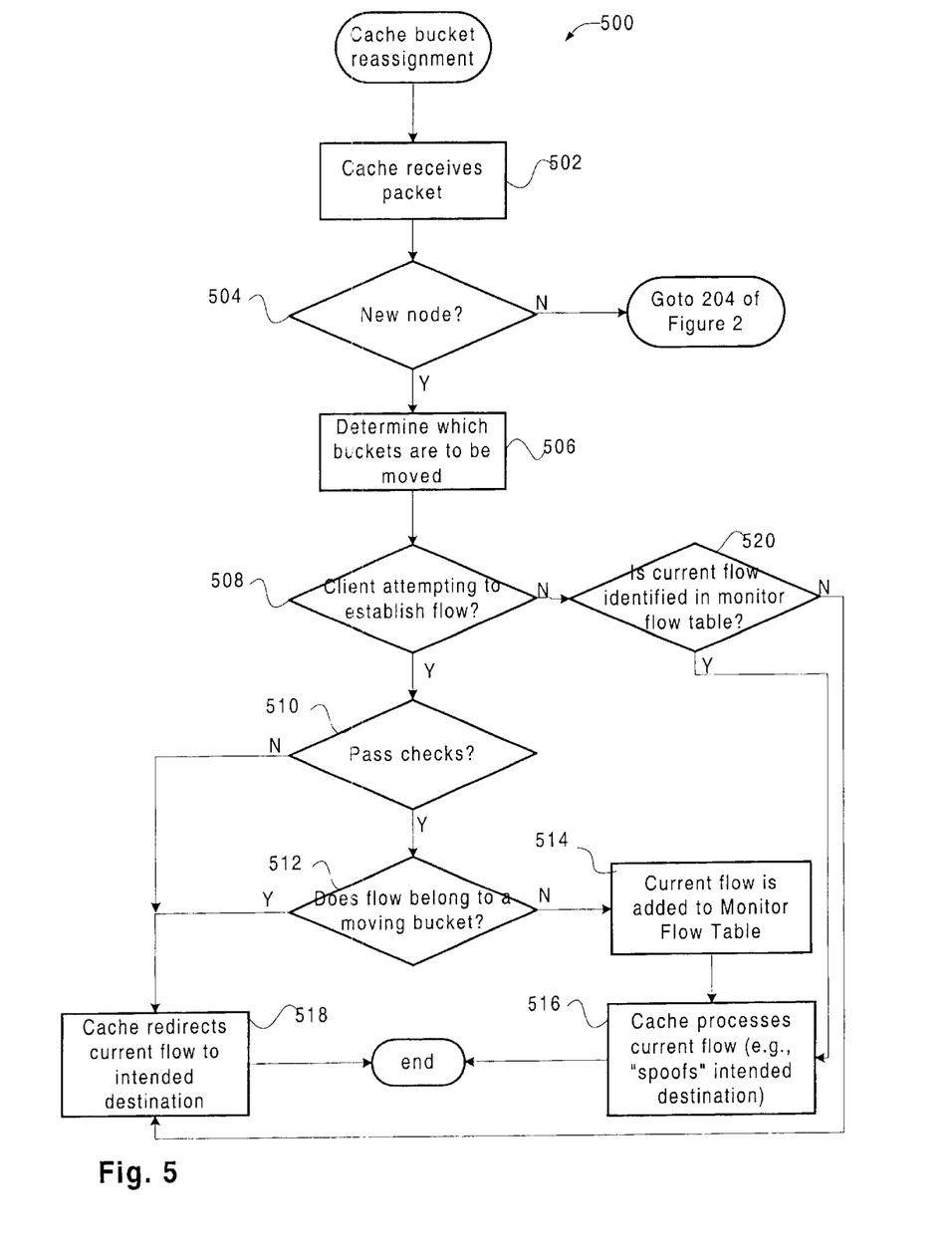
FIG. 5 is a flow chart illustrating a process 500 for reassigning buckets when an additional cache node is detected in an existing service cluster in accordance with another embodiment of the present invention.

FIG. 5 is a flow chart illustrating a process 500 for reassigning buckets when an additional cache node is detected in an existing service cluster in accordance with another embodiment of the present invention. When a new cache node is added, the cluster may then re-allocate hashing-buckets for this new node. This mechanism may be implemented, regardless of whether the hashing method is deterministic, such as in web-caching, or essentially random, such as in reverse-proxy. Mechanisms for allocating hashing-buckets are further described in U.S. application Ser. No. 08/946,867 entitled METHOD AND APPARATUS FOR FACILITATING NETWORK DATA TRANSMISSIONS by Cieslak et al., which is incorporated by reference in its entirety.

In general terms, when a new node is detected, but before a bucket-reassignment is made on the router, the cluster manager (generally the lowest-numbered IP address in the cluster) determines which buckets will need to be moved, and instructs all of the existing nodes (including itself) to stop accepting new connections for any flows which would fall into those buckets. Concurrently, each node may then begin to monitor how many outstanding flows it has in each of those candidate-buckets (the soon-to-be moving buckets), and do whatever it can to help reduce the number to zero (thus, in the case of HTTP, temporarily disabling persistent-connections). Once the number of flows in that bucket has dropped to zero, the node may then inform the cluster-manager that the candidate-bucket is now ready to be moved. Existing flows will be protected because they will be automatically bypassed by the new-node, which will have no record of them in it's monitor flow table.

Referring to FIG. 5, initially a cache node receives a packet (502). It is then determined whether there is a new node (504). If there is not a new node, the flow is processed via the procedures illustrated in FIG. 2. However, if there is a new node, the cluster-manager then determines which buckets are to be moved (506). It is then determined whether the client (who is sending the received packet) is attempting to establish a new flow (508). For example, it is determined whether a "SYN" has been received. If a new flow is being attempted, it is then determined whether any suitable internal checks have been performed and passed (510). For example, it is determined whether the flow belongs to a bypass list. Other internal checks may also be performed, as discussed above with respect to FIG. 2.

If these check(s) are passed (e.g., the flow does not belong to a bypass list), it is then determined whether the flow belongs to a moving bucket (512) (a candidate for displacement). That is, it is determined whether the flow is assigned to a bucket that is going to be re-assigned to another cache node. If the flow belongs to a moving bucket or if the check(s) were not passed, the flow is redirected to its original intended destination (518). The flow may also be added to a bypass list so that it will then be automatically bypassed during any future check(s) for this cache node.

If the flow does not belong to a moving bucket, the flow is added to the monitor flow table (514) and the cache processes the flow (516). If the client is not attempting to establish a new flow (508), it is then determined whether the flow is identified within the monitor flow table (520). If the flow is not identified, the flow is redirected to its original intended destination (518). Otherwise, the flow is processed by the cache (516).

Although the foregoing invention has been described in some detail for purposes of clarity of understanding, it will be apparent that certain changes and modifications may be practiced within the scope of the appended claims. For instance, although the present invention is described as being implemented within the cache system, it may also be operated at any suitable remote computer device. In an alternative embodiment, the router 106 may be configured to intelligently determine whether to direct traffic to the cache system. That is, the router 106 may keep a monitor flow table for each cache system that is coupled thereto. Therefore, the described embodiments should be taken as illustrative and not restrictive, and the invention should not be limited to the details given herein but should be defined by the following claims and their full scope of equivalents.

What is claimed is:

1. A method for controlling packet flow to a cache system, comprising:
    receiving a packet intended for a first destination into the cache system, wherein the packet is associated with a packet flow;
    when the packet indicates the start of the packet flow, processing the packet within the cache system;
    when the packet fails to indicate the start of the packet flow, determining whether the packet flow is identified as being established with the cache system;
    when the packet does not indicate the start of the packet flow and when it is determined that the packet flow is identified as being established with the cache system, processing the packet within the cache system; and
    when the packet does not indicate the start of the packet flow and it is determined that the packet flow is not identified as being established with the cache system, redirecting the packet to the first destination.

2. A method as recited in claim 1 wherein the cache system processes the packet by spoofing the first destination.

3. A method as recited in claim 1 further comprising identifying the packet flow as being established with the cache system when the packet indicates the start of the packet flow.

4. A method as recited in claim 3 wherein the packet flow is identified as being established with the cache system by adding identifying information regarding the packet flow to a monitor flow table associated with the cache system.

5. A method as recited in claim 3 wherein the identifying information includes a tuple of the packet.

6. A method as recited in claim 5 further comprising adding a timestamp and a state of the packet flow to the monitor flow table.

7. A method as recited in claim 1 further comprising:
    determining whether the cache system is in a shutdown mode prior to processing the packet within the cache system when the packet indicates the start of the packet flow; and
    when it is determined that the cache system is in a shutdown mode, redirecting the packet to the first destination without processing the packet within the cache system.

8. A method as recited in claim 1 further comprising:
    determining whether the cache system is overloaded prior to processing the packet within the cache system when the packet indicates the start of the packet flow; and
    when it is determined that the cache system is overloaded, redirecting the packet to the first destination without processing the packet within the cache system.

9. A method as recited in claim 1 further comprising:
    determining whether the packet flow is identified as not to be processed by the cache system prior to processing the packet within the cache system when the packet indicates the start of the packet flow; and
    when it is determined that the packet flow is identified as not to be processed by the cache system, redirecting the packet to the first destination without processing the packet within the cache system.

10. A method as recited in claim 1 further comprising:
    prior to a shut down of the cache system, responding to disconnect requests for flows that are established with the cache system; and
    prior to shut down of the cache system, redirecting disconnect requests to the first destination for flows that are not established with the cache system.

11. A method as recited in claim 10 further comprising determining whether flows are established with the cache system by determining whether identifying information regarding the packet flow is within a monitor flow table associated with the cache system.

12. A method as recited in claim 10 further comprising setting a timeout variable; and when the timeout variable expires, shutting down the cache system even when active flows are still present.

13. A computer system operable to control a packet flow directed to the computer system, comprising:

a memory; and a processor coupled to the memory, wherein at least one of the memory and the processor are adapted to:

receive a packet intended for a first destination into the cache system, wherein the packet is associated with a packet flow;

when the packet indicates the start of the packet flow, process the packet within the cache system;

when the packet fails to indicate the start of the packet flow, determine whether the packet flow is identified as being established with the cache system;

when the packet does not indicate the start of the packet flow and when it is determined that the packet flow is identified as being established with the cache system, process the packet within the cache system; and when the packet does not indicate the start of the packet flow and it is determined that the packet flow is not identified as being established with the cache system, redirect the packet to the first destination.

14. A computer system as recited in claim 13 wherein the processor and the at least one of the memory are further adapted to process the packet by spoofing the first destination.

15. A computer system as recited in claim 13 wherein the processor and the at least one of the memory are further adapted to identify the packet flow as being established with the cache system when the packet indicates the start of the packet flow.

16. A computer system as recited in claim 13 wherein the processor and the at least one of the memory are further adapted to:

determine whether the computer system is in a shutdown mode prior to processing the packet within the computer system when the packet indicates the start of the packet flow; and when it is determined that the computer system is in a shutdown mode, redirect the packet to the first destination without processing the packet within the computer system.

17. A computer system as recited in claim 13 wherein the processor and the at least one of the memory are further adapted to:

determine whether the computer system is overloaded prior to processing the packet within the computer system when the packet indicates the start of the packet flow; and when it is determined that the computer system is overloaded, redirect the packet to the first destination without processing the packet within the computer system.

18. A computer system as recited in claim 13 wherein the processor and the at least one of the memory are further adapted to:

determine whether the packet flow is identified as not to be processed by the computer system prior to processing the packet within the computer system when the packet indicates the start of the packet flow; and when it is determined that the packet flow is identified as not to be processed by the computer system, redirect the packet to the first destination without processing the packet within the computer system.

19. A computer system as recited in claim 13 wherein the processor and the at least one of the memory are further adapted to:

prior to a shut down of the computer system, respond to disconnect requests for flows that are established with the computer system; and prior to shut down of the computer system, redirect disconnect requests to the first destination for flows that are not established with the computer system.

20. A computer program product for controlling packet flow to a cache system the computer program product comprising:

at least one computer readable medium;

computer program instructions stored within the at least one computer readable product configured to:

receive a packet intended for a first destination into the cache system, wherein the packet is associated with a packet flow;

when the packet indicates the start of the packet flow, process the packet within the cache system;

when the packet fails to indicate the start of the packet flow, determine whether the packet flow is identified as being established with the cache system;

when the packet flow does not indicate the start of the packet flow and when it is determined that the packet flow is identified as being established with the cache system, process the packet within the cache system; and when the packet does not indicate the start of the packet flow and it is determined that the packet flow is not identified as being established with the cache system, redirect the packet to the first destination.

21. A computer program product as recited in claim 20 wherein the computer program instructions stored within the at least one computer readable product are further configured to process the packet by spoofing the first destination.

22. A computer program product as recited in claim 20 wherein the computer program instructions stored within the at least one computer readable product are further configured to identify the packet flow as being established with the cache system when the packet indicates the start of the packet flow.

23. A computer program product as recited in claim 20 wherein the computer program instructions stored within the at least one computer readable product are further configured to:

determine whether the computer system is in a shutdown mode prior to processing the packet within the computer system when the packet indicates the start of the packet flow; and when it is determined that the computer system is in a shutdown mode, redirect the packet to the first destination without processing the packet within the computer system.

24. A computer program product as recited in claim 20 wherein the computer program instructions stored within the at least one computer readable product are further configured to:

determine whether the computer system is overloaded prior to processing the packet within the computer system when the packet indicates the start of the packet flow; and when it is determined that the computer system is overloaded, redirect the packet to the first destination without processing the packet within the computer system.

25. A computer program product as recited in claim 20 wherein the computer program instructions stored within the at least one computer readable product are further configured to:

determine whether the packet flow is identified as not to be processed by the computer system prior to processing the packet within the computer system when the packet indicates the start of the packet flow; and when it is determined that the packet flow is identified as not to be processed by the computer system, redirect the packet to the first destination without processing the packet within the computer system.

26. A computer program product as recited in claim 20 wherein the computer program instructions stored within the at least one computer readable product are further configured to:

prior to a shut down of the computer system, respond to disconnect requests for flows that are established with the computer system; and prior to shut down of the computer system, redirect disconnect requests to the first destination for flows that are not established with the computer system.

27. An apparatus for controlling packet flow to a cache system, comprising:

means for receiving a packet intended for a first destination into the cache system, wherein the packet is associated with a packet flow;

means for when the packet indicates the start of the packet flow, processing the packet within the cache system;

means for when the packet fails to indicate the start of the packet flow, determining whether the packet flow is identified as being established with the cache system;

means for when the packet does not indicate the start of the packet flow and when it is determined that the packet flow is identified as being established with the cache system, processing the packet within the cache system; and means for when the packet does not indicate the start of the packet flow and it is determined that the packet flow is not identified as being established with the cache system, redirecting the packet to the first destination.

28. A method as recited in claim 1, further comprising:

determining whether the packet flow belongs to a moving bucket when the packet indicates the start of the packet flow;

identifying the packet flow as being established with the cache system when the packet indicates the start of the packet flow and when it is determined that the packet flow does not belong to a moving bucket, wherein when the packet indicates the start of the packet flow, only processing the packet within the cache when it is determined that the packet flow does not belong to a moving bucket; and when it is determined that the packet flow does belong to a moving bucket, redirecting the packet to the first destination.

29. A computer system as recited in claim 13, wherein the processor and the at least one of the memory are further adapted to:

determine whether the packet flow belongs to a moving bucket when the packet indicates the start of the packet flow;

identify the packet flow as being established with the cache system when the packet indicates the start of the packet flow and when it is determined that the packet flow does not belong to a moving bucket, wherein when the packet indicates the start of the packet flow, only processing the packet within the cache when it is determined that the packet flow does not belong to a moving bucket; and when it is determined that the packet flow does belong to a moving bucket, redirect the packet to the first destination.

30. A computer program product as recited in claim 20, wherein the computer program instructions stored within the at least one computer readable product are further configured to:

determine whether the packet flow belongs to a moving bucket when the packet indicates the start of the packet flow;

identify the packet flow as being established with the cache system when the packet indicates the start of the packet flow and when it is determined that the packet flow does not belong to a moving bucket, wherein when the packet indicates the start of the packet flow, only processing the packet within the cache when it is determined that the packet flow does not belong to a moving bucket; and when it is determined that the packet flow does belong to a moving bucket, redirect the packet to the first destination.

* * * * *